United States Patent
Dudar et al.

(10) Patent No.: US 9,770,980 B2
(45) Date of Patent: Sep. 26, 2017

(54) SYSTEM AND METHODS FOR DETERMINING FUEL FILL LEVEL AND DIAGNOSING FILL LEVEL INDICATOR

(71) Applicant: Ford Global Technologies, LLC, Dearborn, MI (US)

(72) Inventors: Aed M. Dudar, Canton, MI (US); Chingpo Liu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 14/490,220

(22) Filed: Sep. 18, 2014

(65) Prior Publication Data
US 2016/0082832 A1 Mar. 24, 2016

(51) Int. Cl.
| G01M 15/04 | (2006.01) |
| B60K 15/077 | (2006.01) |
| G01M 3/02 | (2006.01) |
| G01M 3/32 | (2006.01) |
| F02M 37/00 | (2006.01) |
| F02M 25/08 | (2006.01) |
| B60K 15/03 | (2006.01) |

(52) U.S. Cl.
CPC ....... *B60K 15/077* (2013.01); *F02M 25/0836* (2013.01); *F02M 37/0064* (2013.01); *G01M 3/025* (2013.01); *G01M 3/3236* (2013.01); *B60K 2015/03217* (2013.01); *B60K 2015/03361* (2013.01)

(58) Field of Classification Search
USPC ............... 73/114.38, 114.43, 114.52, 114.53, 73/114.54
See application file for complete search history.

(56) References Cited

U.S. PATENT DOCUMENTS

| 4,437,162 A | 3/1984 | Kato |
| 4,535,627 A | 8/1985 | Prost et al. |
| 5,379,638 A | 1/1995 | Denz et al. |
| 5,532,673 A * | 7/1996 | Olson ................. B60R 16/0232 340/450.2 |
| 5,859,365 A * | 1/1999 | Kataoka .................. G01F 23/14 73/149 |
| 5,886,625 A | 3/1999 | Uto et al. |
| 6,062,066 A * | 5/2000 | Loen ..................... F02D 33/006 73/37 |
| 6,276,344 B1 | 8/2001 | Isobe et al. |

(Continued)

OTHER PUBLICATIONS

Anonymous, "Method for Controlling a Latching Refuel Valve and Locking Fuel Door to Support Factory Refueling," IPCOM No. 000240498, Published Feb. 3, 2015, 3 pages.

(Continued)

*Primary Examiner* — Eric S McCall
(74) *Attorney, Agent, or Firm* — James Dottavio; McCoy Russell LLP (57) ABSTRACT

A method, comprising indicating an amount of a residual fuel in a fuel tank based on an initial rate of change of a fuel tank pressure during a refueling event. The initial rate of change of fuel tank pressure is proportionate to the amount of vapor dome space within the fuel tank, and thus proportionate to the amount of residual fuel left in the fuel tank. In this way, the fuel tank fill level may be accurately quantified, even during cases where the fill level indicator experiences degradation.

20 Claims, 7 Drawing Sheets

(56) References Cited

U.S. PATENT DOCUMENTS

| | | |
|---|---|---|
| 6,282,953 B1 | 9/2001 | Benjey |
| 6,397,668 B1 | 6/2002 | Davison et al. |
| 6,575,010 B2 | 6/2003 | Colman et al. |
| 6,904,783 B2 | 6/2005 | Elenich et al. |
| 6,907,780 B1 | 6/2005 | Meagher |
| 7,021,117 B2 | 4/2006 | Cho |
| 7,201,052 B2 | 4/2007 | Lee |
| 7,251,997 B1 | 8/2007 | Casey |
| 7,296,600 B2 | 11/2007 | Ferreria et al. |
| 7,621,178 B2 * | 11/2009 | Perinet .................. G01F 22/02 73/149 |
| 7,675,404 B2 | 3/2010 | Kanzaka |
| 8,416,090 B2 | 4/2013 | Bucciero |
| 8,538,591 B1 * | 9/2013 | Klughart ................ G01F 1/363 700/281 |
| 9,546,894 B2 * | 1/2017 | Dudar ..................... G01F 23/18 |
| 2002/0118105 A1 * | 8/2002 | Ansaldi ............... G01F 25/0061 340/450 |
| 2003/0136173 A1 * | 7/2003 | Elenich .................. G01F 9/001 73/1.73 |
| 2007/0012102 A1 * | 1/2007 | Bremmer ............... G01F 23/18 73/299 |
| 2010/0238013 A1 * | 9/2010 | Grothaus ......... B60K 15/03006 340/450.2 |
| 2012/0285238 A1 | 11/2012 | Liu |
| 2012/0325022 A1 | 12/2012 | Shanebrook et al. |
| 2013/0144519 A1 * | 6/2013 | Nakano .................. B60K 15/00 701/123 |
| 2014/0260576 A1 * | 9/2014 | Sweppy .................. G01F 23/32 73/114.54 |
| 2015/0075267 A1 * | 3/2015 | Sweppy ............... G01M 3/3272 73/114.43 |
| 2015/0211914 A1 * | 7/2015 | Dudar ................... G01F 23/246 73/292 |
| 2015/0276457 A1 * | 10/2015 | Dudar .................... G01F 23/18 73/290 R |
| 2016/0313171 A1 * | 10/2016 | Dudar .................... G01F 23/32 |

OTHER PUBLICATIONS

Dudar, A. et al. "Methods and Systems for Fuel Level Indicators in a Saddle Fuel Tank," U.S. Appl. No. 14/697,172, filed Apr. 27, 2015, 59 pages.

Dudar, Aed M. et al., "Systems and Methods for Inferring Fuel Vapor Canister Loading Rate," U.S. Appl. No. 14/606,704, filed Jan. 27, 2015, 43 pages.

Dudar, Aed M., "System and Methods for Fuel Level Inference," U.S. Appl. No. 14/226,498, filed Mar. 26, 2014, 35 pages.

\* cited by examiner

SYSTEM AND METHODS FOR DETERMINING FUEL FILL LEVEL AND DIAGNOSING FILL LEVEL INDICATOR

BACKGROUND AND SUMMARY

Accurately determining and indicating the amount of fuel contained within a fuel tank can often be critical for a vehicle operator. The fuel amount may be used to determine when and where the vehicle should be refueled prior to the fuel tank being emptied.

A typical fuel tank utilizes a dedicated fuel level sensor, such as a floating sensor, to determine the amount of fuel remaining in the fuel tank. However, if the floating sensor becomes stuck, malfunctions, or becomes decoupled from the vehicle powertrain control module, the fuel level may become unknown. An in-dash fuel level indicator may provide an inaccurate or indeterminate fuel level to the vehicle operator. This may lead to the vehicle running out of fuel if the fuel level indicator suggests fuel is still remaining in the tank, or may lead to increased operator anxiety stemming from not knowing how much fuel is remaining in the tank.

Periodically, diagnostic tests may be performed on the fuel level indicator. However, current tests often include monitoring output of the fuel level indicator over a period of 100 miles of engine combustion. For hybrid vehicles, and other vehicles capable of operating without engine combustion for long periods of time, the test may take a long time to complete. Further, the test does not cover the entire range of the fuel level indicator. A fuel level indicator that is prone to stick or has a worn resistive track that effects output only at certain fuel levels may go undiagnosed.

The inventors herein have recognized the above problems and have developed systems and methods to at least partially address them. In one example, a method, comprising indicating an amount of a residual fuel in a fuel tank based on an initial rate of change of a fuel tank pressure during a refueling event. The initial rate of change of fuel tank pressure is proportionate to the amount of vapor dome space within the fuel tank, and thus proportionate to the amount of residual fuel left in the fuel tank. In this way, the fuel tank fill level may be accurately quantified, even during cases where the fill level indicator experiences degradation. The method is applicable to fuel tanks configured to store and receive liquid fuel. The method may further comprise indicating an amount of fuel in the fuel tank based on a sum of an amount of fuel added during the refueling event and the indicated amount of residual fuel, the indicating via a display element in a vehicle in which the fuel tank is positioned. The amount of fuel added during the refueling event may be based on a steady-state fuel tank pressure during a refueling event. In this way, by monitoring fuel tank pressure during a refueling event, an accurate measure of fuel tank fill level may be determined without relying on inferring residual fuel based on total fuel consumed, which assumes fuel injectors do not leak and the fuel system is not otherwise compromised.

In another example, a method for a fuel system, comprising: indicating degradation of a fuel level indicator for a fuel tank based on an output of the fuel level indicator during a steady-state duration of a refueling event. During the steady-state duration of the refueling event, fuel is dispensed into the fuel tank at a constant rate. If the fuel level indicator output does not increase linearly and continuously during this duration, degradation may be indicated. In this way, fuel level indicator degradation may be indicated across the entire range of the fuel level indicator, without relying on methods that require correlating fuel consumption with fuel level indicator output decreasing. For hybrid vehicles, and other propulsion systems that may run for extended periods of time in non-combusting modes, this method provides increased rationality over a compressed timeframe for diagnosing fuel level indicator degradation.

In yet another example, a fuel system for a vehicle, comprising: a fuel tank configured to store liquid fuel; a fuel tank pressure transducer coupled to the fuel tank; a fuel level indicator coupled within the fuel tank; a controller configured with instructions stored in non-transitory memory, that when executed, cause the controller to: monitor an output of the fuel tank pressure transducer during a refueling event; monitor an output of the fuel level indicator during the refueling event; indicate an amount of residual fuel in the fuel tank based on an initial rate of change of a fuel tank pressure during the refueling event; indicate an amount of fuel added to the fuel tank based on a steady-state fuel tank pressure and further based on a steady-state duration; and indicating degradation of a fuel level indicator based on the output of the fuel level indicator during the steady-state duration of a refueling event. In this way, fuel fill level and fuel level indicator degradation may be determined during a single refueling event based on fuel tank pressure during the refueling event.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
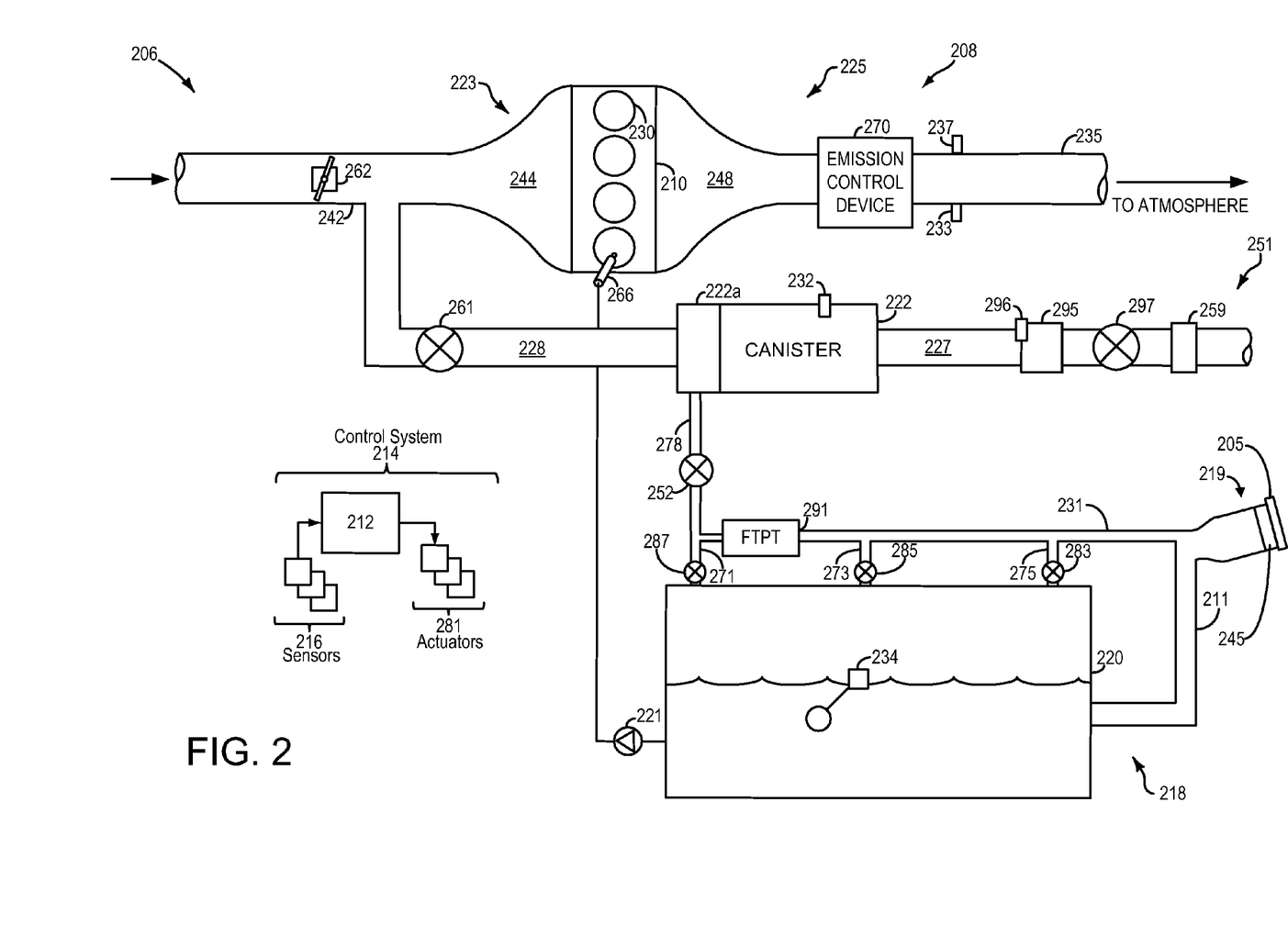
FIG. 2 schematically shows an example vehicle system with a fuel system and an evaporative emissions system.
Figure 3A:
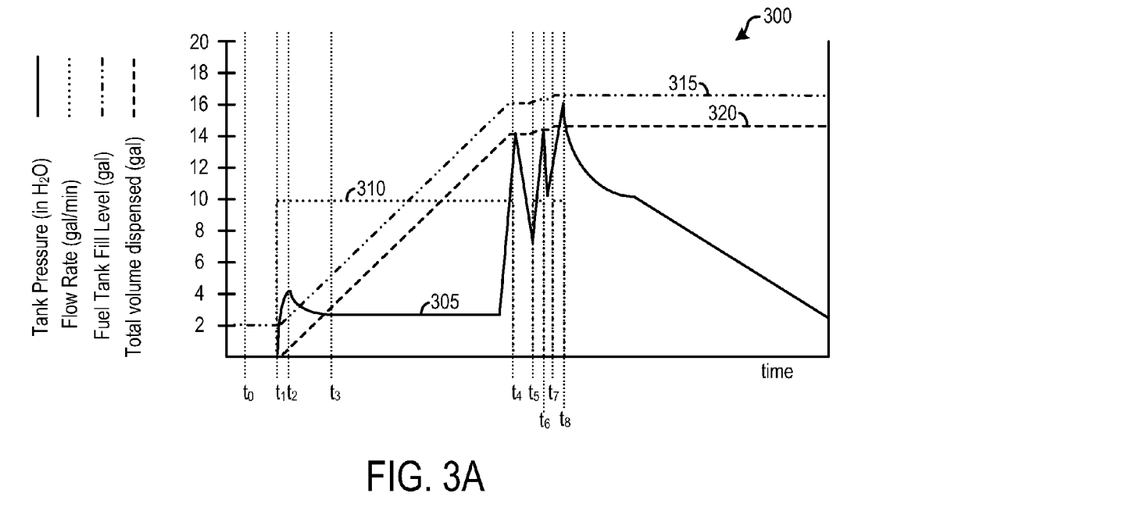
FIG. 3A shows an example timeline for a refueling event.
Figure 3B:
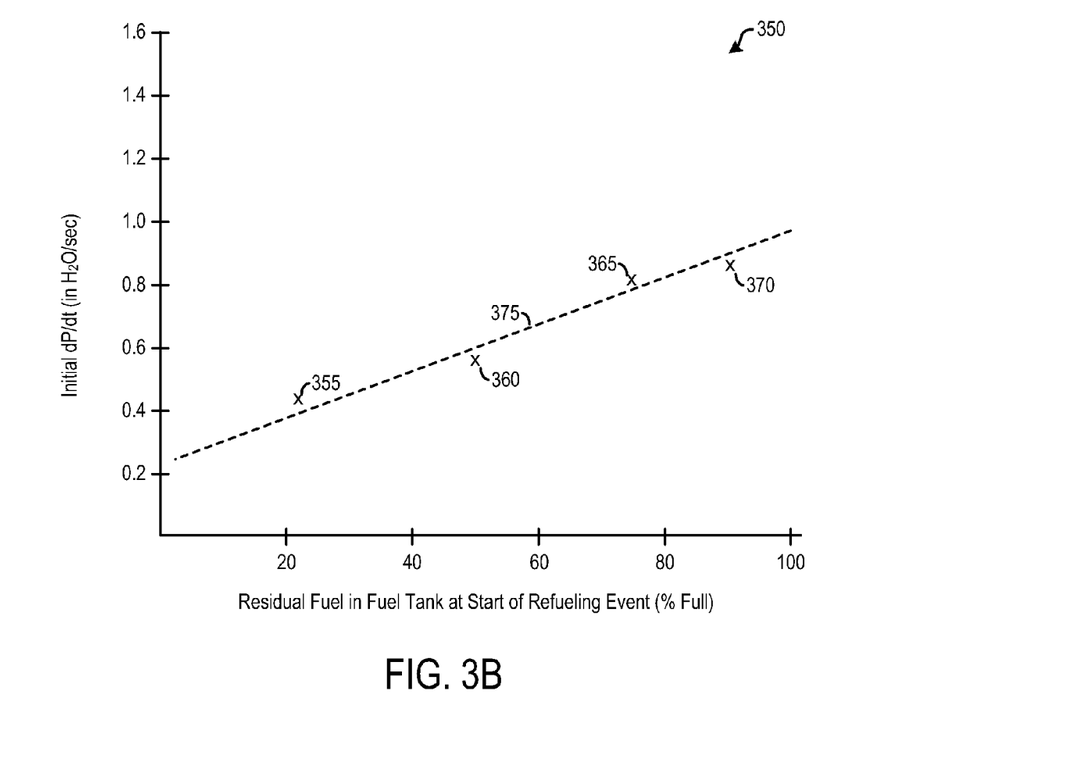
FIG. 3B shows a regression analysis plotting initial rate of change of fuel tank pressure upon refueling against an amount of residual fuel in a fuel tank.
Figure 4A:
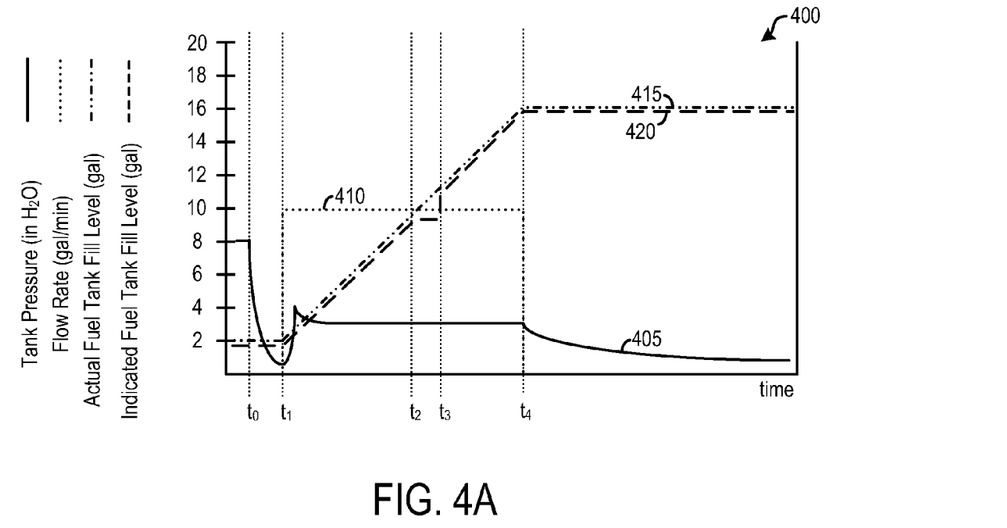
FIG. 4A shows an example timeline for a refueling event for a vehicle comprising a fuel level indicator with a worn resistive track.
Figure 4B:
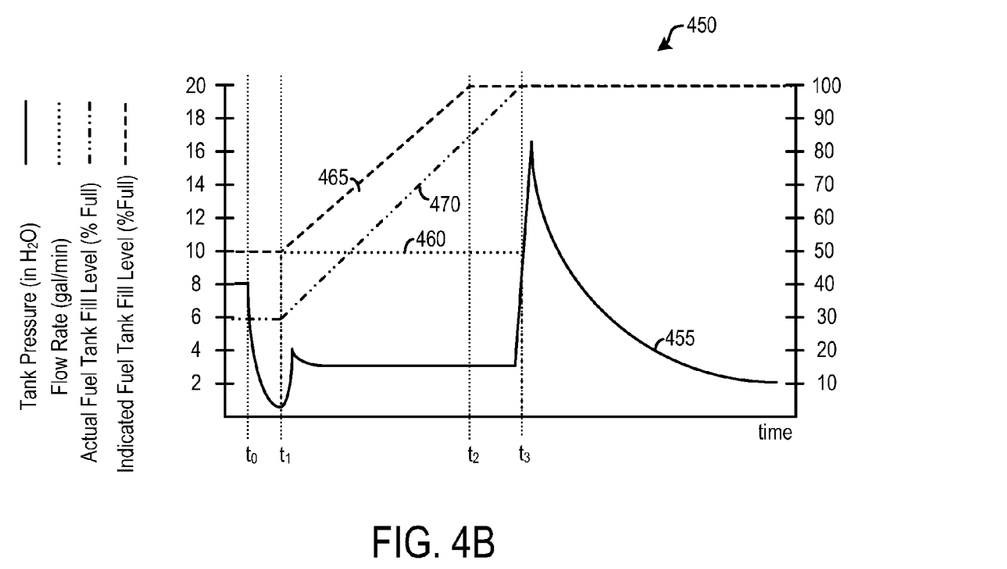
FIG. 4B shows an example timeline for a refueling event for a vehicle comprising a fuel level indicator with a bent arm.
Figure 5:
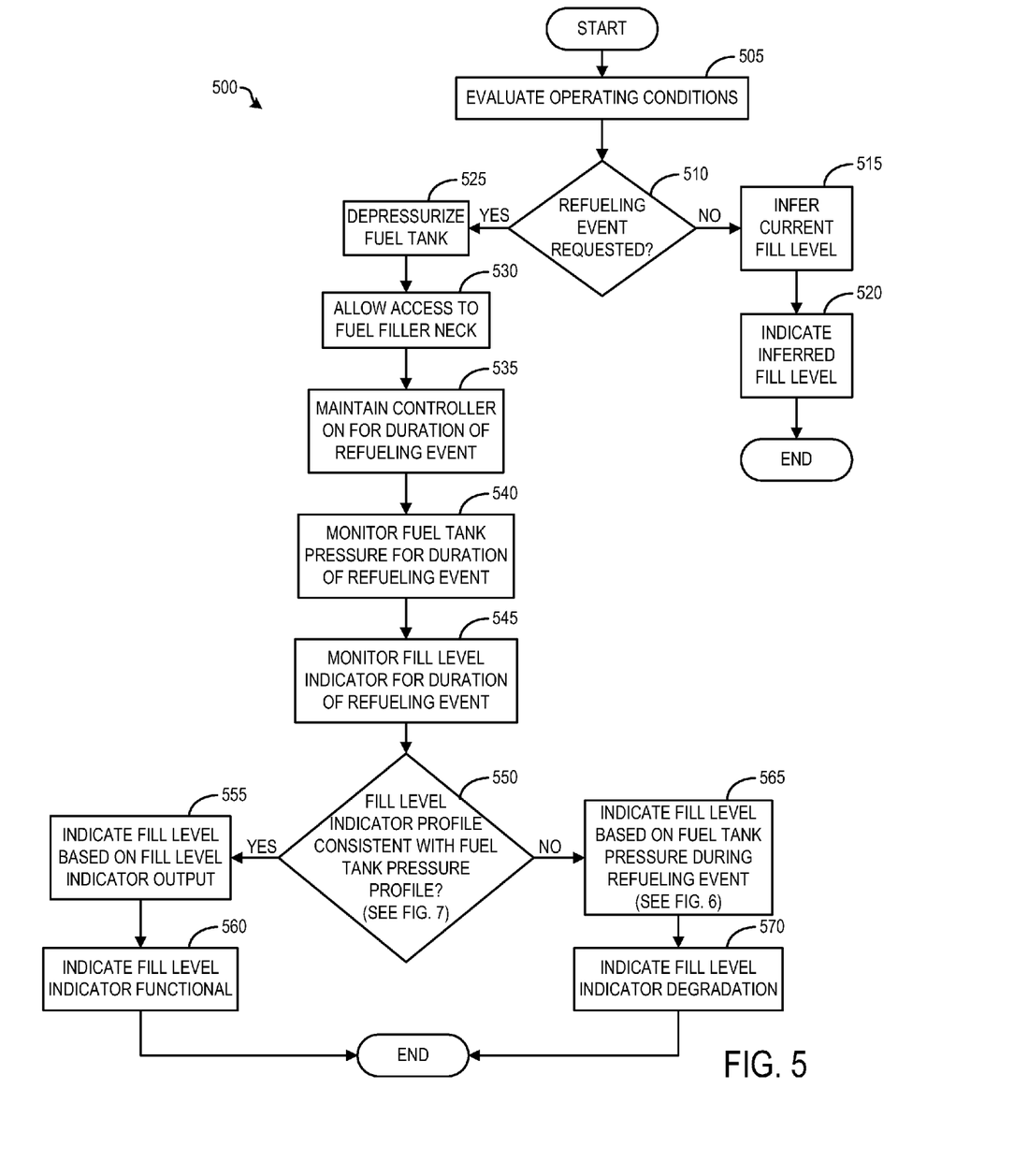
FIG. 5 shows an example method for refueling a vehicle.
Figure 6:
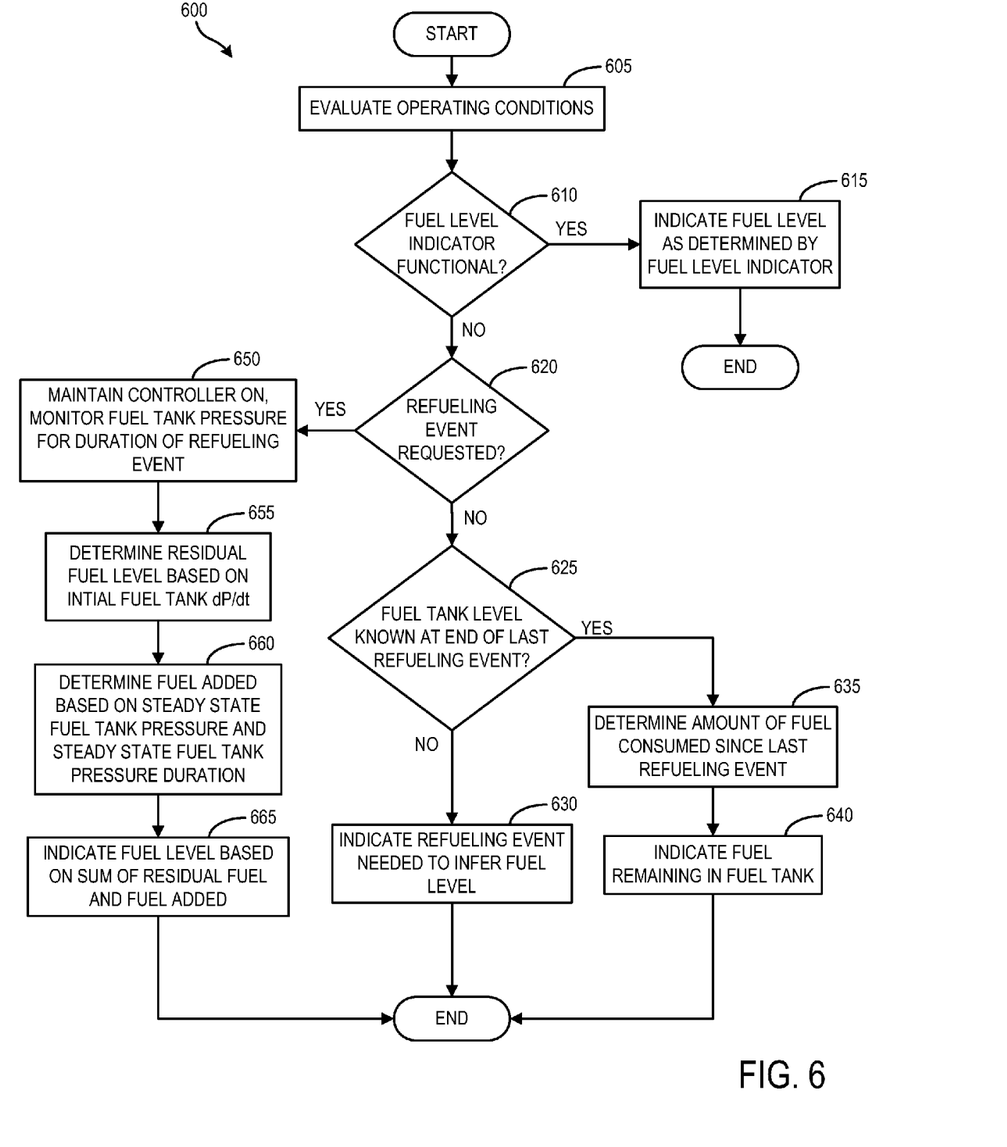
FIG. 6 shows an example method for determining fuel fill level based on fuel tank pressure during a refueling event.
Figure 7:
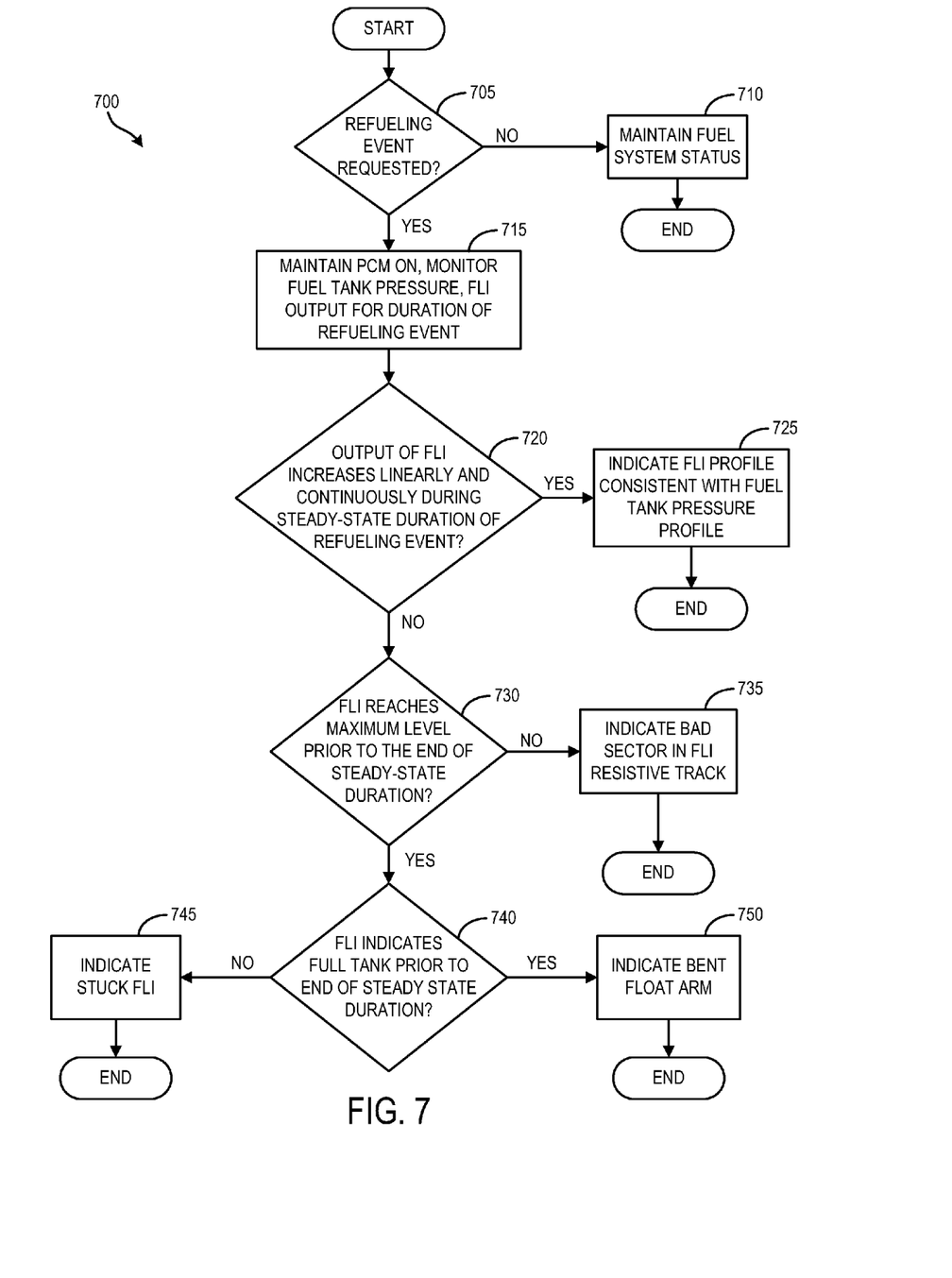
FIG. 7 shows an example method for diagnosing degradation of a fill level indicator based on fuel tank pressure during a refueling event.

The following detailed description relates to systems and methods for determining a fuel fill level of a vehicle fuel tank. Specifically, the description entails means for using fuel tank pressure measurements during a refueling event as a basis for determining the amount of fuel added to the fuel tank. In some examples, the pressure measurements may also be used to diagnose degradation of a fill level indicator. A vehicle fuel tank may be included in a hybrid vehicle, such as the hybrid vehicle depicted in FIG. 1. The fuel tank may be comprised in a fuel system coupled to a vehicle engine as depicted in FIG. 2. The fuel tank may be coupled to a fill level indicator and a fuel tank pressure transducer. If a controller is maintained on during a refueling event, the outputs of the fuel level indicator and fuel tank pressure transducer may be monitored during the refueling event. FIG. 3A shows a timeline for an example refueling event. At the initiation of the refueling event, the fuel tank experiences an initial pressure change. As shown in FIG. 3B, the rate of the initial pressure change is proportionate to the amount of residual fuel in the fuel tank at the initiation of the refueling event. Following the initial pressure rise, the fuel tank experiences a steady-state pressure duration. The steady-state pressure is proportionate to the rate of fuel dispensation into the fuel tank. FIGS. 4A and 4B show example timelines for refueling events where the fuel level indicator is malfunctioning. FIG. 4A shows an example refueling event where the fuel level indicator has a worn resistive track. The fuel level indicator output thus shows non-linearity during the steady-state pressure duration. FIG. 4B shows an example refueling event where the fuel level indicator has a bent arm. The fuel level indicator output thus shows non-continuity during the steady-state pressure duration. FIG. 5B shows an example method for a refueling event wherein the fuel tank pressure is monitored throughout the refueling event to determine fuel tank fill level. FIG. 6 shows an example method for determining fuel fill level based on fuel tank pressure during a refueling event. FIG. 7 shows an example method for diagnosing fuel level indicator degradation based on fuel tank pressure during a refueling event.

Figure 1:
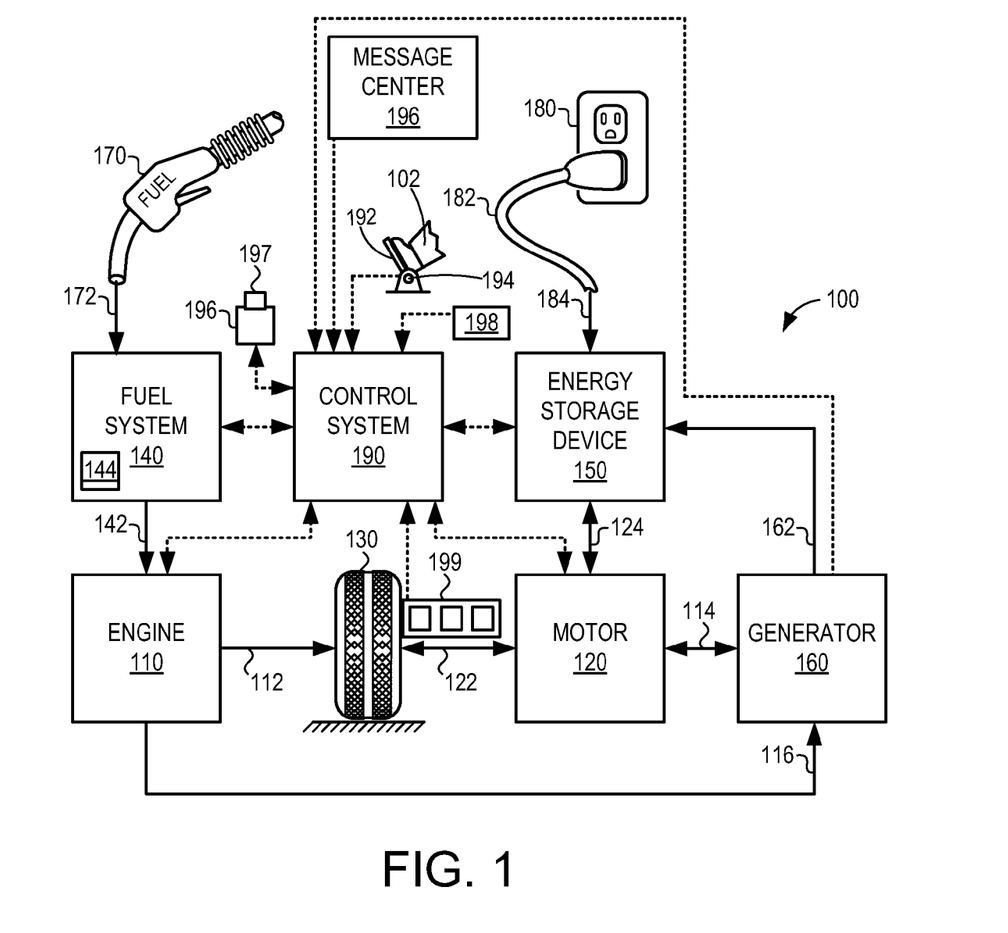
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 5, 6, and 7, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 5, 6, and 7.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

In most vehicles, the output of fuel level sensor 34 is communicatively coupled to an in dash fuel level indicator via controller 12. However, many types of fuel level sensor are prone to sticking or otherwise losing functionality. In such a scenario, the vehicle operator may be left with no indication (or a false indication) of the amount of fuel left in the fuel tank. This, in turn, may lead to the vehicle running out of fuel unexpectedly. During a refueling event, the amount of fuel added to the fuel tank may be quantified. However, determining the amount of residual fuel remaining in the fuel presents additional challenges. Fuel consumed may be determined based on engine operations and subtracted from a previously known value. However, if the fuel injectors leak, or the controller memory is corrupted, this data may become inaccurate.

FIG. 3A shows an example timeline for a refueling event in accordance with the current disclosure. FIG. 3A depicts timeline 300. Timeline 300 includes plot 305, indicating a fuel tank pressure (in $inH_2O$) over time. Timeline 300 further includes plot 310, indicating the flow rate of a liquid fuel (in gallons/min) from a fuel dispenser into a fuel tank over time. Timeline 300 further includes plot 315, indicating the total volume of fuel dispensed (in gallons) into the fuel tank over time. Timeline 300 further includes plot 320, indicating the fuel tank fill level (in gallons) over time.

At time $t_0$, the fuel tank has been depressurized to atmospheric pressure, as indicated by plot 305, but no fuel is being dispensed into the tank, as indicated by plot 310. The fuel tank includes 2 gallons of fuel, as indicated by plot 315. At time $t_1$, a refueling event begins. The fuel dispenser in this example dispenses liquid fuel at a rate of 10 gallons/min, as shown by plot 310. The amount of fuel in the tank increases accordingly, as shown by plot 315, as does the total amount of fuel dispensed, as shown by plot 320.

From time $t_1$ to time $t_2$, the fuel tank pressure undergoes an initial pressure rise. The rate of change of this initial pressure rise is directly proportional to the vapor dome space within the fuel tank, and is thus proportional to the amount of fuel in the fuel tank at the initiation of refueling. From time $t_2$ to time $t_3$, the fuel tank pressure decreases to a steady-state pressure. The steady-state pressure is directly proportional to the flow rate of fuel dispensed in to the fuel tank. As such, the amount of fuel dispensed into the fuel tank can be determined based on the steady-state pressure and the duration of the refueling event. The fuel tank pressure is maintained at the steady-state pressure from time $t_3$ to time $t_4$.

At time $t_4$, the fuel tank reaches a predetermined full fill level, as shown by plot 315. Approaching the full fill level causes the fuel tank pressure to rise, as shown by plot 305. The rise in fuel tank pressure causes an automatic shut-off signal to be sent to the fuel dispenser. Accordingly, the fuel dispenser is shut off at time $t_4$, and fuel dispensing ceases, as shown by plot 310.

From time $t_5$ to time $t_6$, the fuel dispenser operator attempts to trickle-fill additional fuel in the fuel tank, as shown by plot 310. Accordingly, fuel tank pressure increases, as shown by plot 305, although a minimal amount of fuel is added to the tank, as shown by plot 320. At time $t_6$, another automatic shut-off event occurs. As such, the fuel tank dispenser is shut off, as shown by plot 310, and fuel tank pressure decreases, as shown by plot 305. Another trickle-filling event followed by an automatic shut-off event occurs from time $t_7$ to time $t_8$. Following time $t_8$, the fuel tank pressure decreases, as shown by plot 305. The refueling event is then finalized.

As described with regard to FIG. 3A, for a particular fuel tank, the rate of change of the initial fuel tank pressure rise is proportional to the vapor dome space within the tank. FIG. 3B depicts an example plot 350 indicating a linear regression between initial pressure rate of change (dP/dt, in inH$_2$O/sec) and an amount of residual fuel in a fuel tank at the start of a refueling event (as a percentage of a full tank). Plot 350 includes plot point 355, indicating the initial dP/dt for a fuel tank that is 23% full. Plot 350 further includes plot point 360, indicating the initial dP/dt for a fuel tank that is 46% full; plot point 365, indicating the initial dP/dt for a fuel tank that is 72% full, and plot point 370, indicating the initial dP/dt for a fuel tank that is 92% full. Regression line 375 represents the relationship between initial dP/dt and residual fill percentage for an example fuel tank. During (or following) a refueling event, the initial dP/dt may be determined based on output of the fuel tank pressure transducer, and the rate of change then used to determine the residual fill percentage of the fuel tank via an equation or lookup table stored in the vehicle controller. For each fuel tank configuration, an algorithm may be determined and stored at controller 212. For example, the regression plot of FIG. 3B may be described by the following relationship:

$$dP/dt = 0.0067 * (\text{Residual Fuel \%}) + 0.2983$$

Using regression line 375, an initial dP/dt of 0.6 inH$_2$O/sec corresponds with a residual fill percentage of 50%. For a 16 gallon fuel tank, the total residual fuel level may thus be determined to be 8 gallons. Based on the steady-state fuel tank pressure during refueling along with the duration of the refueling event, an amount of fuel dispensed may be determined. The fuel level following the refueling event may thus be determined based on the total residual fuel level and the amount of fuel dispensed.

Periodically, diagnostic tests may be performed on the fuel level indicator. Typically, the diagnostic test includes monitoring the output of the fuel level indicator over the course of 100 miles of vehicle travel with engine combustion. For hybrid vehicles, and other vehicles capable of operating without engine combustion for long periods of time, the test may take a long time to complete. Further, the test does not cover the entire range of the fuel level indicator. A fuel level indicator that is prone to stick or has a worn resistive track that effects output only at certain fuel levels may go undiagnosed. In some examples, a single diagnostic code indicating fuel level indicator degradation is stored. However, numerous potential types of degradation may occur for a single fuel level indicator. For example, a fuel level arm may be bent, the indicator may become stuck, or the resistive track may become worn. The diagnostic and repair process may become costly, as each possibility needs to be tested.

FIG. 4A shows an example timeline for a refueling event for a vehicle comprising a fuel level indicator with a worn restive track in accordance with the current disclosure. FIG. 4A depicts timeline 400. Timeline 400 includes plot 405, indicating a fuel tank pressure (in inH$_2$O) over time. Timeline 400 further includes plot 410, indicating the flow rate of a liquid fuel (in gallons/min) from a fuel dispenser into a fuel tank over time. Timeline 400 further includes plot 415, indicating the actual fuel tank fill level (in gallons) over time. Timeline 400 further includes plot 420, indicating the indicated fuel tank fill level (in gallons) over time.

At time $t_0$, a refueling request is received. Accordingly, the fuel tank is depressurized, as shown by plot 405. The fuel tank includes 2 gallons of liquid fuel, as shown by plot 415, which is accurately indicated by the fuel level indicator, as shown by plot 420. At time $t_1$, the refueling event begins, as shown by plot 410. Fuel is delivered at a constant flow rate of 10 gal/min from time $t_1$ to time $t_4$. Following an initial pressure rise at time $t_1$, the fuel tank pressure is maintained a steady-state pressure until time $t_4$, as shown by plot 405. A time $t_4$, the refueling event ends, and the fuel tank pressure decreases.

However, from time $t_2$ to time $t_3$, the indicated fuel level does not increase linearly, as shown by plot 420. Rather, the indicated fuel level remains constant from time $t_2$ to time $t_3$, then jumps to reflect the actual fill level. As the fuel tank pressure indicates constant fuel dispensing from time $t_2$ to time $t_3$, degradation of the fuel level indicator may be diagnosed as due to a worn or defective resistor track. Specifically, the wear may be localized to the region of output where the non-linearity occurred.

FIG. 4B shows an example timeline for a refueling event for a vehicle comprising a fuel level indicator with a worn restive track in accordance with the current disclosure. FIG. 4B depicts timeline 450. Timeline 450 includes plot 455, indicating a fuel tank pressure (in inH$_2$O) over time. Timeline 450 further includes plot 460, indicating the flow rate of a liquid fuel (in gallons/min) from a fuel dispenser into a fuel tank over time. Timeline 450 further includes plot 465, indicating the actual fuel tank fill level (in percent full) over time. Timeline 450 further includes plot 470, indicating the indicated fuel tank fill level (in percent full) over time.

At time $t_0$, a refueling request is received. Accordingly, the fuel tank is depressurized, as shown by plot 405. The fuel tank is 30% full, as shown by plot 415. However, the fuel level indicator indicates that the fuel tank is 50% full, as shown by plot 420. At time $t_1$, the refueling event begins, as shown by plot 410. Fuel is delivered at a constant flow rate of 10 gal/min from time $t_1$ to time $t_3$. Following an initial pressure rise at time $t_1$, the fuel tank pressure is maintained a steady-state pressure until time $t_3$, as shown by plot 455. A time $t_3$, the fuel tanks reaches the actual fill limit. Accordingly, the fuel tank pressure spikes, triggering an automatic shutoff of the refueling dispenser. The refueling event then ends, and the fuel tank pressure decreases. However, the fuel level indicator indicates that the tank is full at time $t_2$, when the fuel tank is only 80% full. As the fuel tank pressure indicates constant fuel dispensing from time $t_2$ to time $t_3$, degradation of the fuel level indicator may be diagnosed as due to a bent arm.

FIG. 5 depicts a flow chart for an example high-level method 500 for a refueling event in accordance with the present disclosure. In particular, method 500 relates to monitoring fuel tank pressure during a refueling event in order to evaluate the integrity of a fuel level indicator and indicate the fuel fill level accordingly. Method 500 will be described herein with reference to the components and systems depicted in FIGS. 1 and 2, though it should be understood that the method may be applied to other systems without departing from the scope of this disclosure. Method 500 may be carried out by controller 212, and may be stored as executable instructions in non-transitory memory.

Method 500 may begin at 505. At 505, method 500 may include evaluating operating conditions. Operating conditions may comprise one or more vehicle conditions, one or more engine conditions, and/or one or more fuel system conditions. For example, operating conditions may include, but are not limited to, fuel tank pressure, fuel tank fill level, ambient temperature, engine operating status, vehicle location (as determined through an on-board GPS, for example), etc. Operating conditions may be measured by one or more sensors 216 coupled to controller 212, or may be estimated or inferred based on available data.

Continuing at 510, method 500 may include determining whether a refueling event has been requested. For example, hybrid vehicle 100 comprises a refueling button 197 located on the vehicle dashboard. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In other examples, a refueling event may be inferred by the vehicle operator (or a refueling attendant) opening a refueling door or otherwise attempting to gain access to fuel filler system 219.

If no refueling event has been received, method 500 may proceed to 515. At 515, method 500 may include inferring the current fuel fill level. In some examples, inferring the current fuel level may include measuring the current fuel fill level using a fuel level indicator, such as fuel level indicator 234. In some examples, such as when degradation of the fuel level indicator has been diagnosed, the fuel fill level may be inferred, for example, by determining an amount of fuel expended since a previous known fuel level. For example, following the filling of a fuel tank, as indicated by an automatic shutoff event, a full fuel tank may be inferred. The amount of fuel consumed following the filling of the fuel tank may be determined, for example, by summing the amount of fuel injected into the engine over vehicle operation since the completion of the last refueling event. Continuing at 520, method 500 may include indicating the inferred fuel level, for example, at an in-dash fill level indicator. Method 500 may then end.

If a refueling event request is received, method 500 may proceed to 525. At 525, method 500 may include depressurizing the fuel tank. For example, fuel tank 220 may be depressurized by opening FTIV 252 and venting fuel vapor to fuel vapor canister 222. Upon the fuel tank pressure decreasing below a threshold (e.g. atmospheric pressure), method 500 may proceed to 530. At 530, method 500 may include allowing access to the fuel filler neck. For example, controller 212 may unlock refueling lock 245. As described with regard to FIG. 2, refueling lock 245 may be a refueling door lock, a fuel cap lock, a filler pipe valve lock, etc.

Continuing at 535, method 500 may include maintaining the controller on for the duration of the refueling event. Maintaining the controller on may include maintaining power to sensors and actuators included in the refueling system. At 540, method 500 may include monitoring fuel tank pressure for the duration of the refueling event. For example, the output of FTPT 291 may be monitored, recorded, and/or stored at controller 212. At 545, method 500 may include monitoring the fill level indicator for the duration of the refueling event. For example, the output of FLI 234 may be monitored, recorded, and/or stored at controller 212.

At 550, method 500 may include determining whether the fill level indicator profile is consistent with the fuel tank pressure profile for the duration of the event. As described with regards to FIGS. 4A and 4B, periods of time during the refueling event where the fuel tank pressure indicates fuel is being deposited into the tank, but the fuel level indicator is not increasing linearly may indicate degradation of the fuel level indicator. A more detailed method for determining whether the fill level indicator profile is consistent with the fuel tank pressure profile is described herein and with regard to FIG. 7. If the fill level indicator profile is consistent with the fuel tank pressure profile, method 500 may proceed to 555. At 555, method 500 may include indicating the fuel tank fill level based on the fill level indicator output. Continuing at 560, method 500 may include indicating that the fill level indicator is functional. Method 500 may then end.

If the fill level indicator profile is not consistent with the fuel tank pressure profile, method 500 may proceed to 565. At 565, method 500 may include indicating the fill level based on the fuel tank pressure during the refueling event. A more detailed method for determining and indicating the fill level based on the fuel tank pressure during the refueling event is described herein and with regard to FIG. 6. Continuing at 570, method 500 may include indicating degradation of the fill level indicator. Method 500 may then end.

FIG. 6 depicts a flow chart for an example high-level method 600 for a refueling event in accordance with the present disclosure. In particular, method 600 relates to determining fuel tank fill level based on fuel tank pressure following a refueling event during a condition where a fuel level is not functioning. Method 600 will be described herein with reference to the components and systems depicted in FIGS. 1 and 2, though it should be understood that the method may be applied to other systems without departing from the scope of this disclosure. Method 600 may be carried out by controller 212, and may be stored as executable instructions in non-transitory memory.

Method 600 may begin at 605. At 605, method 600 may include evaluating operating conditions. Operating conditions may comprise one or more vehicle conditions, one or more engine conditions, and/or one or more fuel system conditions. For example, operating conditions may include, but are not limited to, fuel tank pressure, fuel tank fill level, ambient temperature, engine operating status, vehicle location (as determined through an on-board GPS, for example), etc. Operating conditions may be measured by one or more sensors 216 coupled to controller 212, or may be estimated or inferred based on available data.

Continuing at 610, method 600 may include determining whether the fuel level indicator is functional. Determining whether the fuel level sensor is function may include accessing information related to a recent fuel level sensor test, accessing information related to degradation codes associated with the fuel level sensor, actively testing the sensor, or otherwise inferring the functionality of the fuel level sensor. If the fuel level sensor is determined to be functional, method 500 may proceed to 615. At 615, method 600 may include indicating the fuel level as determined by the fuel level sensor. The fuel level may be recorded by controller 12, and may be indicated on an in-dash fuel level indicator. Method 600 may then end.

If the fuel level sensor is not functional, method 600 may proceed to 620. At 620, method 600 may include determining whether a refueling event has been requested. As described with regard to FIG. 5, a refueling event may be requested via depression of a refueling request button, detecting proximity to a refueling station, inferred by detection of a refueling door opening, and/or other suitable indicators of a refueling event request.

If no refueling event is requested, method 600 may proceed to 625. At 625, method 600 may include determining whether the fuel tank fill level was known at the end of the last refueling event. The fuel tank fill level at the end of the last refueling event may have been determined by a previously functional fuel level sensor, a fuel level algorithm (such as method 600), or via the detection of an automatic-shut off event due to a full fuel tank.

If the fuel tank level was not known at the end of the last refueling event, method 600 may proceed to 630. At 630, method 600 may include indicating that a refueling event is required in order to infer the fuel level going forward. Indicating the need for a refueling event may include communicating with the vehicle operator via an in-dash messaging system, via a communication sent to the vehicle operator's phone, etc. Method 600 may then end.

If the fuel tank level was known at the end of the last refueling event, method 600 may proceed to 635. At 635, method 600 may include determining the amount of fuel consumed since the last refueling event. Determining the amount of fuel consumed since the last refueling event may include, for example, summing the amount of fuel injected into engine 210 over vehicle operation since the completion of the last refueling event. Continuing at 640, method 600 may include determining and indicating the amount of fuel remaining in the fuel tank. Determining the amount of fuel remaining in the fuel tank may include subtracting the amount of fuel consumed since the last refueling event from the amount of fuel in the fuel tank at the end of the last refueling event. An indication of the amount of fuel remaining in the fuel tank may be recorded by controller 212, and may further be indicated on an in-dash fuel level indicator. Method 600 may then end.

Returning to 620, if a refueling event is requested, method 600 may proceed to 650. At 650, method 600 may include maintaining the controller on and monitoring fuel tank pressure for the duration of the refueling event, as described with regard to FIG. 5. Method 600 may further include depressurizing the fuel tank and allowing access to the fuel filler neck.

Continuing at 655, method 600 may include determining a residual fuel level based on an initial fuel tank dP/dt. As described herein and with regards to FIGS. 3A-3B, the initial rising edge of a fuel tank pressure profile during a refueling event may be used to determine a residual fuel level. The rate of change of fuel tank pressure is proportionate to the amount of vapor dome space inside the fuel tank, and thus proportionate to the amount of fuel in the fuel tank. An algorithm and/or lookup table for determining residual fuel level based on initial fuel tank dP/dt may be stored on controller 212 in non-transitory memory.

Continuing at 660, method 600 may include determining fuel added during the refueling event based on steady-state fuel tank pressure and steady-state fuel tank pressure duration. The duration of the steady-state pressure may be indicated by an initial pressure change and a final pressure change. The initial pressure change may be a based on an increase of pressure, indicating an influx of liquid fuel into the fuel tank, and/or may be based on a decrease in pressure following an initial increase in pressure. For example, the initiation of a refueling event may cause an immediate pressure spike above the steady-state pressure. The final pressure change may be a decrease in pressure from the steady-state pressure, (e.g. cessation of fuel dispensation) or may be an increase in pressure from the steady-state pressure (e.g. approaching a full fill level). As such, the controller may determine the amount of fuel added based on an integration of the fuel flow rate over the duration of the steady-state pressure. The controller may determine the amount of fuel added based on a ratio of the duration of the steady-state pressure to the estimated time-to-full duration. Look-up tables or algorithms for determining the amount of fuel added may be stored at controller 212 in non-transitory memory.

Continuing at 670, method 600 may include indicating the fuel level based on a sum of the residual fuel level and the amount of fuel added. Indicating the current fuel level may include recording the fuel level at controller 12, and may further include indicating the fuel level at a dash mounted fuel level indicator. The indicated fuel tank fill level may be utilized by controller 212 in downstream calculations that would typically be based on a measurement from the fuel level indicator. For example, the fuel level may be used in the calculation of a miles-to-empty parameter that may be displayed to the vehicle operator on an in-dash indicator. The fuel level may be updated throughout engine operation, for example, based on the amount of fuel consumed by engine 210. Method 600 may then end.

FIG. 7 depicts a flow chart for an example high-level method 700 for diagnosing a fuel level indicator in accordance with the present disclosure. In particular, method 700 relates to diagnosing a fuel level indicator during a refueling event based on a fuel tank pressure profile. Method 700 will be described herein with reference to the components and systems depicted in FIGS. 1 and 2, though it should be understood that the method may be applied to other systems without departing from the scope of this disclosure. Method 700 may be carried out by controller 212, and may be stored as executable instructions in non-transitory memory.

Method 700 may begin at 705. At 705, method 700 may include determining whether a refueling event has been requested. As described with regard to FIG. 5, a refueling event may be requested via depression of a refueling request button, detecting proximity to a refueling station, inferred by detection of a refueling door opening, and/or other suitable indicators of a refueling event request. If no refueling event is requested, method 700 may proceed to 710 and may include maintaining the fuel system status. Method 700 may then end.

If a refueling event has been requested, method 700 may proceed to 715. At 715, method 700 may include maintaining the controller on and monitoring fuel tank pressure for the duration of the refueling event, as described with regard to FIG. 5. Method 700 may further include depressurizing the fuel tank and allowing access to the fuel filler neck.

Continuing at 720, method 700 may include determining whether the output of the fuel level indicator increases linearly and continuously during the steady-state duration of the refueling event. As shown in FIGS. 4A and 4B, during the steady-state portion of the refueling event, the fuel level increases linearly, and a functional fuel level indicator should increase linearly and continuously accordingly. If the fuel level indicator output does increase linearly and continuously during the steady-state duration of the refueling event, method 700 may proceed to 725. At 725, method 700 may include indicating the fuel level indicator profile is consistent with the fuel tank pressure profile. Method 700 may further include indicating that the fuel level indicator is functional, and that the output of the fuel level indicator accurately reflects the amount of fuel in the fuel tank. Method 700 may then end.

If the output of the fuel level indicator does not increase linearly and continuously during the steady state duration of the refueling event, method 700 may proceed to 730. At 730, method 700 may include determining whether the FLI reaches a maximum output prior to the end of the steady-state duration of the refueling event. In other words, the method may segregate FLI errors that increase continuously but not linearly from those that increase linearly but not continuously. For example, as described herein and shown in FIG. 4A, a bad sector in an FLI resistive track may cause the output of the FLI to jump or otherwise increase non-linearly, even as the rate of fuel dispensing into the fuel tank remains constant. If the FLI does not reach a maximum output prior to the end of the steady-state duration of the refueling event, method 735 may proceed to 735. At 735, method 700 may include indicating a bad sector in an FLI resistive track, or other continuity error applicable to the type of FLI included in the fuel system. Method 700 may then end.

If the FLI output reaches a maximum output prior to the end of the steady-state duration of the refueling event, method 700 may proceed to 740. At 740, method 700 may include determining whether the FLI indicates the tank is full prior to the end of the steady state duration. For example, as described herein and shown in FIG. 4B, premature indication of a full fuel tank may be indicative of a bent FLI arm. If the FLI does not indicate the tank is full prior to the end of the steady state duration, rather reaching a maximum output that is below a full tank, or not increasing at all, method 700 may proceed to 745. At 745, method 700 may include indicating a stuck FLI. Method 700 may then end. If the FLI indicates the tank is full prior to the end of the steady state duration, method 700 may proceed to 750. At 750, method 700 may include indicating a bent FLI arm. Method 700 may then end. FLI degradation may be indicated with a diagnostic code stored at controller 212, and may be further indicated at an in-dash console. Degradation of the FLI may further lead the controller to determine and indicate fuel tank fill level based on fuel tank pressure during refueling events.

The systems described herein and with regard to FIGS. 1 and 2, along with the methods described herein and with regard to FIGS. 5, 6, and 7 may enable one or more systems and one or more methods. In one example, a method, comprising indicating an amount of a residual fuel in a fuel tank based on an initial rate of change of a fuel tank pressure during a refueling event. The residual fuel may be a liquid fuel. The method may further comprise: following a refueling event, indicating an amount of fuel in the fuel tank based on the indicated amount of residual fuel. The method may further comprise: indicating an amount of fuel in the fuel tank based on a sum of an amount of fuel added during the refueling event and the indicated amount of residual fuel, the indicating via a display element in a vehicle in which the fuel tank is positioned. The method may further comprise: indicating an amount of fuel added during the refueling event based on a steady-state fuel tank pressure during a refueling event. The fuel added during the refueling event may be a liquid fuel. The method may further comprise: indicating degradation of a fill level indicator based on the steady-state fuel tank pressure during the refueling event. The method may further comprise: indicating degradation of the fill level indicator based on an output of the fill level indicator during a steady-state fuel tank pressure portion of the refueling event. The technical result of implementing this method is that fuel tank fill level may be accurately quantified even if the fill level indicator is degraded, as the initial rate of change of fuel tank pressure is proportionate to the amount of vapor dome space within the fuel tank, and thus proportionate to the amount of residual fuel left in the fuel tank. The amount of fuel added may be determined based on the steady-state fuel tank pressure and the length of the steady-state duration.

In another example, a method for a fuel system, comprising: indicating degradation of a fuel level indicator for a fuel tank based on an output of the fuel level indicator during a steady-state duration of a refueling event. The steady-state duration may be based on a steady-state fuel tank pressure during the refueling event. The method may further comprise: indicating degradation of the fuel level indicator responsive the output of the fuel level indicator increasing non-linearly during the steady-state duration. Indicating a worn resistor track in the fuel level indicator may be responsive to the output of the fuel level indicator increasing non-linearly during the steady-state duration. Indicating degradation of the fuel level indicator may be responsive to the output of the fuel level indicator reaching a maximum level prior to an end of the steady-state duration. The method may further comprise: indicating a bent fuel level indicator arm responsive to the output of the fuel level indicator indicating a full fuel tank prior to the end of the steady-state duration. In some examples, indicating a stuck fuel level indicator may be responsive to the output of the fuel level indicator reaching a maximum level less than a full fuel tank prior to the end of the steady-state duration. The method may further comprise: responsive to indicating degradation of the fuel level indicator, indicating a fuel tank fill level based on the steady-state duration and further based on the steady-state fuel tank pressure. Indicating a fuel tank fill level may be based on an amount of fuel added during the refueling event and an amount of residual fuel in the fuel tank at an initiation of the refueling event. The amount of residual fuel in the fuel tank may be indicated based on an initial rate of change of a fuel tank pressure during the refueling event. The technical result of implementing this method is that fuel level indicator degradation may be indicated across the entire range of the fuel level indicator, without relying on methods that require correlating fuel consumption with fuel level indicator output decreasing. For hybrid vehicles, and other propulsion systems that may run for extended periods of time in non-combusting modes, this method provides increased rationality over a compressed timeframe for diagnosing fuel level indicator degradation. Further, the type of fuel level indicator degradation may be pinpointed based on the linearity and continuity of the fuel level indicator output during the steady-state duration.

In yet another example, a fuel system for a vehicle, comprising: a fuel tank configured to store liquid fuel; a fuel tank pressure transducer coupled to the fuel tank; a fuel level indicator coupled within the fuel tank; a controller configured with instructions stored in non-transitory memory, that when executed, cause the controller to: monitor an output of the fuel tank pressure transducer during a refueling event; monitor an output of the fuel level indicator during the refueling event; indicate an amount of residual fuel in the fuel tank based on an initial rate of change of a fuel tank pressure during the refueling event; indicate an amount of fuel added to the fuel tank based on a steady-state fuel tank pressure and further based on a steady-state duration; and indicating degradation of a fuel level indicator based on the output of the fuel level indicator during the steady-state duration of a refueling event. The controller may further configured with instructions stored in non-transitory memory, that when executed, cause the controller to: indicate a worn resistor track in the fuel level indicator responsive the output of the fuel level indicator increasing non-linearly during the steady-state duration; indicate a bent fuel level indicator arm responsive to the output of the fuel level indicator indicating a full fuel tank prior to an end of the steady-state duration; and indicate a stuck fuel level indicator responsive to the output of the fuel level indicator reaching a maximum level less than a full fuel tank prior to the end of the steady-state duration. The technical result of implementing this system is that fuel fill level and fuel level indicator degradation may be determined during a single refueling event based on fuel tank pressure during the refueling event. This reduces the risk of a vehicle running out of fuel, and increases the likelihood of diagnosing a degraded fuel level indicator.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a refueling event,
receiving liquid fuel in a fuel tank; and
indicating an amount of residual fuel in the fuel tank at initiation of the refueling event based on an initial rate of change of a fuel tank pressure during the refueling event.

2. The method of claim 1, where the residual fuel is a liquid fuel.

3. The method of claim 2, further comprising:
indicating an amount of fuel in the fuel tank following the refueling event based on the indicated amount of residual fuel.

4. The method of claim 3, wherein the indicating includes, indicating the amount of fuel in the fuel tank following the refueling event based on a sum of an amount of fuel added during the refueling event and the indicated amount of residual fuel in the fuel tank at the initiating of the refueling event, the indicating via a display element in a vehicle in which the fuel tank is positioned.

5. The method of claim 4, further comprising:
indicating the amount of fuel added during the refueling event based on a steady-state fuel tank pressure during the refueling event.

6. The method of claim 5, wherein the fuel added during the refueling event is a liquid fuel.

7. The method of claim 5, further comprising:
indicating degradation of a fill level indicator based on the steady-state fuel tank pressure during the refueling event.

8. The method of claim 7, further comprising:
indicating degradation of the fill level indicator based on an output of the fill level indicator during a steady-state fuel tank pressure portion of the refueling event.

9. A method for a fuel system, comprising:
indicating degradation of a fuel level indicator for a fuel tank based on an output of the fuel level indicator during a steady-state duration of a refueling event where fuel is dispensed into the fuel tank at a constant rate.

10. The method of claim 9, wherein the steady-state duration is based on a steady-state fuel tank pressure during the refueling event.

11. The method of claim 10, further comprising:
indicating degradation of the fuel level indicator responsive to the output of the fuel level indicator increasing non-linearly during the steady-state duration.

12. The method of claim 11, further comprising:
indicating a worn resistor track in the fuel level indicator responsive to the output of the fuel level indicator increasing non-linearly during the steady-state duration.

13. The method of claim 10, further comprising:
indicating degradation of the fuel level indicator responsive to the output of the fuel level indicator reaching a maximum level prior to an end of the steady-state duration.

14. The method of claim 13, further comprising:
indicating a bent fuel level indicator arm responsive to the output of the fuel level indicator indicating a full fuel tank prior to the end of the steady-state duration.

15. The method of claim 14, further comprising:
indicating a stuck fuel level indicator responsive to the output of the fuel level indicator reaching a maximum level less than a full fuel tank prior to the end of the steady-state duration.

16. The method of claim 10, further comprising:
responsive to indicating degradation of the fuel level indicator, indicating a fuel tank fill level based on the steady-state duration and further based on the steady-state fuel tank pressure.

17. The method of claim 16, further comprising:
indicating a fuel tank fill level based on an amount of fuel added during the refueling event and an amount of residual fuel in the fuel tank at an initiation of the refueling event.

18. The method of claim 17, further comprising:
indicating the amount of residual fuel in the fuel tank based on an initial rate of change of a fuel tank pressure during the refueling event.

19. A fuel system for a vehicle, comprising:
a fuel tank configured to store liquid fuel;
a fuel tank pressure transducer coupled to the fuel tank;
a fuel level indicator coupled within the fuel tank;
a controller configured with instructions stored in non-transitory memory, that when executed, cause the controller to:
- monitor an output of the fuel tank pressure transducer during a refueling event;
- monitor an output of the fuel level indicator during the refueling event;
- indicate an amount of residual fuel in the fuel tank based on an initial rate of change of a fuel tank pressure during the refueling event;
- indicate an amount of fuel added to the fuel tank based on a steady-state fuel tank pressure and further based on a steady-state duration; and
- indicating degradation of the fuel level indicator based on the output of the fuel level indicator during the steady-state duration of the refueling event.

20. The fuel system of claim 19, where the controller is further configured with instructions stored in non-transitory memory, that when executed, cause the controller to:
- indicate a worn resistor track in the fuel level indicator responsive to the output of the fuel level indicator increasing non-linearly during the steady-state duration;
- indicate a bent fuel level indicator arm responsive to the output of the fuel level indicator indicating a full fuel tank prior to an end of the steady-state duration; and
- indicate a stuck fuel level indicator responsive to the output of the fuel level indicator reaching a maximum level less than a full fuel tank prior to the end of the steady-state duration.

* * * * *